(12) United States Patent
Yeh et al.

(10) Patent No.: US 12,086,819 B2
(45) Date of Patent: Sep. 10, 2024

(54) SYSTEM AND METHOD FOR CROWD MANAGEMENT AND MAINTENANCE OPERATIONS

(71) Applicant: Universal City Studios LLC, Universal City, CA (US)

(72) Inventors: Wei Yeh, Orlando, FL (US); Travis Cossairt, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/320,061

(22) Filed: May 18, 2023

(65) Prior Publication Data

US 2023/0289831 A1 Sep. 14, 2023

Related U.S. Application Data

(63) Continuation of application No. 17/219,998, filed on Apr. 1, 2021, now Pat. No. 11,694,217, which is a
(Continued)

(51) Int. Cl.
*G06Q 30/0201* (2023.01)
*G06Q 10/00* (2023.01)
(Continued)

(52) U.S. Cl.
CPC ......... *G06Q 30/0201* (2013.01); *G06Q 10/00* (2013.01); *G06Q 10/06* (2013.01); *G06Q 10/06311* (2013.01); *G06Q 10/20* (2013.01)

(58) Field of Classification Search
CPC .... G06Q 30/0201; G06Q 10/00; G06Q 10/06; G06Q 10/20
See application file for complete search history.

(56) References Cited

U.S. PATENT DOCUMENTS 5,946,444 A 8/1999 Evans et al.
6,142,368 A 11/2000 Mullins et al.
(Continued)

FOREIGN PATENT DOCUMENTS

CN 102147939 A 8/2011
CN 102354406 A 2/2012
(Continued)

OTHER PUBLICATIONS

PCT/US2018/056922 International Search Report and Written Opinion dated Dec. 5, 2018.
(Continued)

*Primary Examiner* — Dylan C White
(74) *Attorney, Agent, or Firm* — Fletcher Yoder P.C.

(57) ABSTRACT

A crowd management system includes at least one local controller associated with an attraction area of an individual attraction within a theme park. The crowd management system includes a transceiver of the at least one local controller, where the transceiver receives guests data via wireless signals from guest-associated devices within a detection range of the local controller. The crowd management system includes a remote central controller in communication with the at least one local controller and the guest-associated device. The remote central controller receives the guest data from the at least one local controller and determines one or more crowd metrics of the individual attraction based on the guest data. The remote central controller generates an activity command based on the one or more crowd metrics. The remote central controller transmits the activity command to at least one guest-associated device of the guest-associated devices.

18 Claims, 7 Drawing Sheets

Related U.S. Application Data continuation of application No. 15/826,357, filed on Nov. 29, 2017, now Pat. No. 10,970,725.

(51) Int. Cl.
  *G06Q 10/06* (2023.01)
  *G06Q 10/0631* (2023.01)
  *G06Q 10/20* (2023.01)

(56) References Cited

U.S. PATENT DOCUMENTS

| | | |
|---|---|---|
| 6,307,952 B1 | 10/2001 | Dietz |
| 6,346,886 B1 | 2/2002 | De La Huerga |
| 6,352,205 B1 | 3/2002 | Mullins et al. |
| 6,474,557 B2 | 11/2002 | Mullins et al. |
| 6,526,158 B1 | 2/2003 | Goldberg |
| 6,634,949 B1 | 10/2003 | Briggs et al. |
| 6,680,707 B2 | 1/2004 | Allen et al. |
| 6,761,637 B2 | 7/2004 | Weston et al. |
| 6,822,569 B1 | 11/2004 | Bellum et al. |
| 6,888,502 B2 | 5/2005 | Beigel et al. |
| 6,908,387 B2 | 6/2005 | Hedrick et al. |
| 6,967,566 B2 | 11/2005 | Weston et al. |
| 7,029,400 B2 | 4/2006 | Briggs |
| 7,047,205 B2 | 5/2006 | Hale et al. |
| 7,066,781 B2 | 6/2006 | Weston |
| 7,204,425 B2 | 4/2007 | Mosher, Jr. et al. |
| 7,224,967 B2 | 5/2007 | Hale et al. |
| 7,311,605 B2 | 12/2007 | Moser |
| 7,327,251 B2 | 2/2008 | Corbett, Jr. |
| 7,336,178 B2 | 2/2008 | Le |
| 7,336,185 B2 | 2/2008 | Turner et al. |
| 7,385,498 B2 | 6/2008 | Dobosz |
| 7,396,281 B2 | 7/2008 | Mendelsohn et al. |
| 7,400,253 B2 | 7/2008 | Cohen |
| 7,445,550 B2 | 11/2008 | Barney et al. |
| 7,479,886 B2 | 1/2009 | Burr |
| 7,488,231 B2 | 2/2009 | Weston |
| 7,492,254 B2 | 2/2009 | Bandy et al. |
| 7,500,917 B2 | 3/2009 | Barney et al. |
| 7,528,729 B2 | 5/2009 | Light et al. |
| 7,541,926 B2 | 6/2009 | Dugan et al. |
| 7,564,360 B2 | 7/2009 | Cote et al. |
| 7,564,426 B2 | 7/2009 | Poor et al. |
| 7,606,540 B2 | 10/2009 | Yoon |
| 7,614,958 B2 | 11/2009 | Weston et al. |
| 7,642,921 B2 | 1/2010 | Cutler et al. |
| 7,674,184 B2 | 3/2010 | Briggs et al. |
| 7,720,718 B2 | 5/2010 | Hale et al. |
| 7,739,925 B2 | 6/2010 | Foster |
| 7,749,089 B1 | 7/2010 | Briggs et al. |
| 7,752,794 B2 | 7/2010 | Kerlin |
| 7,775,894 B2 | 8/2010 | Henry et al. |
| 7,786,871 B2 | 8/2010 | Schwarze et al. |
| 7,791,557 B2 | 9/2010 | Mickle et al. |
| 7,802,724 B1 | 9/2010 | Nohr |
| 7,812,779 B2 | 10/2010 | Turner et al. |
| 7,817,044 B2 | 10/2010 | Posamentier |
| 7,837,567 B2 | 11/2010 | Holzberg et al. |
| 7,850,527 B2 | 12/2010 | Barney et al. |
| 7,855,697 B2 | 12/2010 | Chamarti et al. |
| 7,878,905 B2 | 2/2011 | Weston et al. |
| 7,881,713 B2 | 2/2011 | Hale et al. |
| 7,885,763 B2 | 2/2011 | Havens |
| 7,896,742 B2 | 3/2011 | Weston et al. |
| 7,925,308 B2 | 4/2011 | Greene et al. |
| 7,942,320 B2 | 5/2011 | Joe |
| 7,956,725 B2 | 6/2011 | Smith |
| 7,994,910 B2 | 8/2011 | Brooks et al. |
| 7,997,981 B2 | 8/2011 | Rowe et al. |
| 8,016,667 B2 | 9/2011 | Benbrahim |
| 8,035,335 B2 | 10/2011 | Duron et al. |
| 8,082,165 B2 | 12/2011 | Natsuyama et al. |
| 8,085,130 B2 | 12/2011 | Liu et al. |
| 8,089,458 B2 | 1/2012 | Barney et al. |
| 8,123,613 B2 | 2/2012 | Dabrowski |
| 8,164,567 B1 | 4/2012 | Barney et al. |
| 8,169,406 B2 | 5/2012 | Barney et al. |
| 8,184,097 B1 | 5/2012 | Barney et al. |
| 8,200,515 B2 | 6/2012 | Natsuyama et al. |
| 8,213,862 B2 | 7/2012 | Muth |
| 8,222,996 B2 | 7/2012 | Smith et al. |
| 8,226,493 B2 | 7/2012 | Briggs et al. |
| 8,231,047 B2 | 7/2012 | Canora |
| 8,237,561 B2 | 8/2012 | Beigel et al. |
| 8,248,208 B2 | 8/2012 | Renfro, Jr. |
| 8,248,367 B1 | 8/2012 | Barney et al. |
| 8,253,533 B2 | 8/2012 | Jones |
| 8,253,542 B2 | 8/2012 | Canora et al. |
| 8,296,983 B2 | 10/2012 | Padgett et al. |
| 8,313,381 B2 | 11/2012 | Ackley et al. |
| 8,330,284 B2 | 12/2012 | Weston et al. |
| 8,330,587 B2 | 12/2012 | Kupstas |
| 8,342,929 B2 | 1/2013 | Briggs et al. |
| 8,353,705 B2 | 1/2013 | Dobson et al. |
| 8,368,648 B2 | 2/2013 | Barney et al. |
| 8,373,543 B2 | 2/2013 | Brommer et al. |
| 8,373,659 B2 | 2/2013 | Barney et al. |
| 8,384,668 B2 | 2/2013 | Barney et al. |
| 8,392,506 B2 | 3/2013 | Rowe et al. |
| 8,416,087 B2 | 4/2013 | Canora et al. |
| 8,425,313 B2 | 4/2013 | Nelson et al. |
| 8,430,749 B2 | 4/2013 | Nelson et al. |
| 8,463,183 B2 | 6/2013 | Muth |
| 8,475,275 B2 | 7/2013 | Weston et al. |
| 8,477,046 B2 | 7/2013 | Alonso |
| 8,489,657 B2 | 7/2013 | Shepherd et al. |
| 8,491,389 B2 | 7/2013 | Weston et al. |
| 8,531,050 B2 | 9/2013 | Barney et al. |
| 8,552,597 B2 | 10/2013 | Song et al. |
| 8,564,414 B2 | 10/2013 | Bergevoet |
| 8,571,905 B2 | 10/2013 | Risnoveanu et al. |
| 8,581,721 B2 | 11/2013 | Asher et al. |
| 8,593,283 B2 | 11/2013 | Smith |
| 8,593,291 B2 | 11/2013 | Townsend et al. |
| 8,597,111 B2 | 12/2013 | LeMay et al. |
| 8,608,535 B2 | 12/2013 | Weston et al. |
| 8,618,928 B2 | 12/2013 | Weed et al. |
| 8,621,245 B2 | 12/2013 | Shearer et al. |
| 8,635,126 B2 | 1/2014 | Risnoveanu et al. |
| 8,681,000 B2 | 3/2014 | August et al. |
| 8,682,729 B2 | 3/2014 | Werbitt |
| 8,686,579 B2 | 4/2014 | Barney et al. |
| 8,702,515 B2 | 4/2014 | Weston et al. |
| 8,708,821 B2 | 4/2014 | Barney et al. |
| 8,711,094 B2 | 4/2014 | Barney et al. |
| 8,742,623 B1 | 6/2014 | Biederman et al. |
| 8,753,165 B2 | 6/2014 | Weston |
| 8,758,136 B2 | 6/2014 | Briggs et al. |
| 8,773,245 B2 | 7/2014 | Canora et al. |
| 8,790,180 B2 | 7/2014 | Barney et al. |
| 8,797,146 B2 | 8/2014 | Cook et al. |
| 8,810,373 B2 | 8/2014 | Kim et al. |
| 8,810,430 B2 | 8/2014 | Proud |
| 8,814,688 B2 | 8/2014 | Barney et al. |
| 8,816,873 B2 | 8/2014 | Bisset et al. |
| 8,821,238 B2 | 9/2014 | Ackley et al. |
| 8,827,810 B2 | 9/2014 | Weston et al. |
| 8,830,030 B2 | 9/2014 | Arthurs et al. |
| 8,851,372 B2 | 10/2014 | Zhou et al. |
| 8,866,673 B2 | 10/2014 | Mendelson |
| 8,870,641 B2 | 10/2014 | Dabrowski |
| 8,888,576 B2 | 11/2014 | Briggs et al. |
| 8,913,011 B2 | 12/2014 | Barney et al. |
| 8,915,785 B2 | 12/2014 | Barney et al. |
| 8,917,172 B2 | 12/2014 | Charych |
| 8,923,994 B2 | 12/2014 | Laikari et al. |
| 8,924,432 B2 | 12/2014 | Richards et al. |
| 8,937,530 B2 | 1/2015 | Smith et al. |
| 8,961,260 B2 | 2/2015 | Weston |
| 8,961,312 B2 | 2/2015 | Barney et al. |
| 8,971,804 B2 | 3/2015 | Butler |
| 8,972,048 B2 | 3/2015 | Canora et al. |
| 9,002,264 B2 | 4/2015 | Zhang |

(56) References Cited

U.S. PATENT DOCUMENTS

| | | |
|---|---|---|
| 9,021,277 B2 | 4/2015 | Shearer et al. |
| 9,039,533 B2 | 5/2015 | Barney et al. |
| 9,072,965 B2 | 7/2015 | Kessman et al. |
| 9,087,246 B1 | 7/2015 | Chin et al. |
| 9,109,763 B1 | 8/2015 | Wein |
| 9,122,964 B2 | 9/2015 | Krawczewicz |
| 9,130,651 B2 | 9/2015 | Tabe |
| 9,138,650 B2 | 9/2015 | Barney et al. |
| 9,149,717 B2 | 10/2015 | Barney et al. |
| 9,162,148 B2 | 10/2015 | Barney et al. |
| 9,162,149 B2 | 10/2015 | Weston et al. |
| 9,178,569 B2 | 11/2015 | Chakravarty et al. |
| 9,186,585 B2 | 11/2015 | Briggs et al. |
| 9,196,964 B2 | 11/2015 | Baringer |
| 9,207,650 B2 | 12/2015 | Narendra et al. |
| 9,215,592 B2 | 12/2015 | Narendra et al. |
| 9,225,372 B2 | 12/2015 | Butler |
| 9,232,475 B2 | 1/2016 | Heinzelman et al. |
| 9,245,158 B2 | 1/2016 | Gudan et al. |
| 9,272,206 B2 | 3/2016 | Weston et al. |
| 9,318,898 B2 | 4/2016 | John |
| 9,320,976 B2 | 4/2016 | Weston |
| 9,367,852 B2 | 6/2016 | Canora et al. |
| 9,383,730 B2 | 7/2016 | Prestenback |
| 9,393,491 B2 | 7/2016 | Barney et al. |
| 9,393,500 B2 * | 7/2016 | Barney .................. A63F 13/31 |
| 9,411,992 B1 | 8/2016 | Marek et al. |
| 9,412,231 B2 | 8/2016 | Dabrowski |
| 9,413,229 B2 | 8/2016 | Fleming |
| 9,424,451 B2 | 8/2016 | Kalhous et al. |
| 9,438,044 B2 | 9/2016 | Proud |
| 9,443,382 B2 | 9/2016 | Lyons |
| 9,446,319 B2 | 9/2016 | Barney et al. |
| 9,463,380 B2 | 10/2016 | Weston et al. |
| 9,468,854 B2 | 10/2016 | Briggs et al. |
| 9,474,962 B2 | 10/2016 | Barney et al. |
| 9,480,929 B2 | 11/2016 | Weston |
| 9,483,906 B2 | 11/2016 | LeMay et al. |
| 9,491,584 B1 | 11/2016 | Mendelson |
| 9,523,775 B2 | 12/2016 | Chakraborty et al. |
| 9,542,579 B2 | 1/2017 | Mangold et al. |
| 9,563,898 B2 | 2/2017 | McMahan et al. |
| 9,579,568 B2 | 2/2017 | Barney et al. |
| 9,582,981 B2 | 2/2017 | Rokhsaz et al. |
| 9,589,224 B2 | 3/2017 | Patterson et al. |
| 9,613,237 B2 | 4/2017 | Nikunen et al. |
| 9,616,334 B2 | 4/2017 | Weston et al. |
| 9,626,672 B2 | 4/2017 | Fisher |
| 9,642,089 B2 | 5/2017 | Sharma et al. |
| 9,646,312 B2 | 5/2017 | Lyons et al. |
| 9,651,992 B2 | 5/2017 | Stotler |
| 9,661,450 B2 | 5/2017 | Agrawal et al. |
| 9,675,878 B2 | 6/2017 | Barney et al. |
| 9,680,533 B2 | 6/2017 | Gudan et al. |
| 9,692,230 B2 | 6/2017 | Biederman et al. |
| 9,696,802 B2 | 7/2017 | Priyantha et al. |
| 9,706,924 B2 | 7/2017 | Greene |
| 9,707,478 B2 | 7/2017 | Barney et al. |
| 9,712,980 B1 | 7/2017 | Filatoff |
| 9,713,766 B2 | 7/2017 | Barney et al. |
| 9,731,194 B2 | 8/2017 | Briggs et al. |
| 9,737,797 B2 | 8/2017 | Barney et al. |
| 9,741,022 B2 | 8/2017 | Ziskind et al. |
| 9,743,357 B2 | 8/2017 | Tabe |
| 9,747,538 B2 | 8/2017 | Gudan et al. |
| 9,748,632 B2 | 8/2017 | Rokhsaz et al. |
| 9,754,139 B2 | 9/2017 | Chemishkian et al. |
| 9,754,202 B2 | 9/2017 | Gudan et al. |
| 9,756,579 B2 | 9/2017 | Zhou et al. |
| 9,762,292 B2 | 9/2017 | Manian et al. |
| 9,767,649 B2 | 9/2017 | Dabrowski |
| 9,770,652 B2 | 9/2017 | Barney et al. |
| 9,813,855 B2 | 11/2017 | Sahadi et al. |
| 9,814,973 B2 | 11/2017 | Barney et al. |
| 9,831,724 B2 | 11/2017 | Copeland et al. |
| 9,836,103 B2 | 12/2017 | Kramer et al. |
| 9,837,865 B2 | 12/2017 | Mitcheson et al. |
| 9,861,887 B1 | 1/2018 | Briggs et al. |
| 9,864,882 B1 | 1/2018 | Geist et al. |
| 9,867,024 B1 | 1/2018 | Larson |
| 9,871,298 B2 | 1/2018 | Daniel et al. |
| 9,909,896 B2 | 3/2018 | Bass et al. |
| 9,928,527 B2 | 3/2018 | Woycik et al. |
| 9,928,681 B2 | 3/2018 | LeMay, Jr. et al. |
| 9,931,578 B2 | 4/2018 | Weston |
| 9,936,357 B2 | 4/2018 | Mills et al. |
| 9,949,219 B2 | 4/2018 | Belogolovy |
| 9,972,894 B2 | 5/2018 | Dion et al. |
| 9,993,724 B2 | 6/2018 | Barney et al. |
| 10,010,790 B2 | 7/2018 | Weston et al. |
| 10,022,624 B2 | 7/2018 | Barney et al. |
| 10,304,276 B2 | 5/2019 | Schwartz et al. |
| 10,360,419 B1 | 7/2019 | Yeh et al. |
| 10,507,387 B2 | 12/2019 | Weston et al. |
| 10,537,803 B2 | 1/2020 | Yeh et al. |
| 10,583,357 B2 | 3/2020 | Barney et al. |
| 10,603,564 B2 | 3/2020 | Yeh et al. |
| 10,614,271 B2 | 4/2020 | Cossairt et al. |
| 10,695,689 B2 | 6/2020 | Weston |
| 10,699,084 B2 | 6/2020 | Yeh et al. |
| 10,818,152 B2 | 10/2020 | Yeh et al. |
| 10,846,967 B2 | 11/2020 | Usi et al. |
| 11,443,575 B1 | 9/2022 | Aman et al. |
| 11,452,942 B2 | 9/2022 | Linguanti et al. |
| 2009/0216547 A1 | 8/2009 | Canora et al. |
| 2012/0040766 A1 | 2/2012 | Crawford et al. |
| 2012/0286938 A1 | 11/2012 | Cote et al. |
| 2013/0324059 A1 | 12/2013 | Lee et al. |
| 2014/0122170 A1 | 5/2014 | Padgett et al. |
| 2014/0162693 A1 | 6/2014 | Wachter et al. |
| 2015/0046202 A1 | 2/2015 | Hunt |
| 2015/0078140 A1 | 3/2015 | Riobo Aboy et al. |
| 2015/0138556 A1 | 5/2015 | LeBoeuf et al. |
| 2015/0194817 A1 | 7/2015 | Lee et al. |
| 2015/0236551 A1 | 8/2015 | Shearer et al. |
| 2015/0255226 A1 | 9/2015 | Rouvala et al. |
| 2015/0312517 A1 | 10/2015 | Hoyt et al. |
| 2015/0336013 A1 | 11/2015 | Stenzler et al. |
| 2015/0371194 A1 | 12/2015 | Marshall et al. |
| 2016/0019423 A1 | 1/2016 | Ortiz et al. |
| 2016/0020636 A1 | 1/2016 | Khlat |
| 2016/0020637 A1 | 1/2016 | Khlat |
| 2016/0055429 A1 | 2/2016 | Schwartz |
| 2016/0067600 A1 | 3/2016 | Barney et al. |
| 2016/0144280 A1 | 5/2016 | Pawlowski et al. |
| 2016/0170998 A1 | 6/2016 | Frank et al. |
| 2016/0182165 A1 | 6/2016 | Margon et al. |
| 2016/0203663 A1 | 7/2016 | Proctor |
| 2016/0217496 A1 | 7/2016 | Tuchman et al. |
| 2016/0226610 A1 | 8/2016 | Pinzon Gonzales, Jr. |
| 2016/0307398 A1 | 10/2016 | Walker et al. |
| 2016/0321548 A1 | 11/2016 | Ziskind et al. |
| 2016/0373522 A1 | 12/2016 | Carlos et al. |
| 2017/0091850 A1 | 3/2017 | Alvarez et al. |
| 2017/0093463 A1 | 3/2017 | Wang et al. |
| 2017/0115018 A1 | 4/2017 | Mintz |
| 2017/0132438 A1 | 5/2017 | Cletheroe et al. |
| 2017/0162006 A1 | 6/2017 | Sahadi et al. |
| 2017/0169449 A1 | 6/2017 | Heaven et al. |
| 2017/0186270 A1 | 6/2017 | Acres |
| 2017/0201003 A1 | 7/2017 | Ackley et al. |
| 2017/0228804 A1 | 8/2017 | Soni et al. |
| 2017/0235369 A1 | 8/2017 | Acer et al. |
| 2017/0237466 A1 | 8/2017 | Carr |
| 2017/0270734 A1 | 9/2017 | Geraghty et al. |
| 2017/0288735 A1 | 10/2017 | Zhou et al. |
| 2017/0293985 A1 | 10/2017 | Deria et al. |
| 2017/0331509 A1 | 11/2017 | Gollakota et al. |
| 2017/0340961 A1 | 11/2017 | Weston et al. |
| 2017/0348593 A1 | 12/2017 | Barney et al. |
| 2017/0358957 A1 | 12/2017 | Mitcheson et al. |
| 2017/0361236 A1 | 12/2017 | Barney et al. |
| 2017/0373526 A1 | 12/2017 | Huang et al. |
| 2018/0014385 A1 | 1/2018 | Wein |

(56) References Cited

U.S. PATENT DOCUMENTS

| | | |
|---|---|---|
| 2018/0078853 A1 | 3/2018 | Barney et al. |
| 2018/0117465 A1 | 5/2018 | Voris et al. |
| 2018/0214769 A1 | 8/2018 | Briggs et al. |
| 2018/0318723 A1 | 11/2018 | Weston |
| 2018/0339226 A1 | 11/2018 | Barney et al. |
| 2019/0201768 A1 | 7/2019 | Yeh et al. |
| 2019/0201806 A1 | 7/2019 | Weston |
| 2019/0304216 A1 | 10/2019 | Mendelson et al. |
| 2021/0217030 A1 | 7/2021 | Yeh et al. |
| 2022/0143518 A1 | 5/2022 | Chatrath et al. |
| 2022/0207495 A1* | 6/2022 | Derouen .......... G06Q 10/06315 |
| 2022/0214742 A1 | 7/2022 | Yeh et al. |
| 2023/0154261 A1* | 5/2023 | DeMattio ................ G07C 9/22 340/5.61 |

FOREIGN PATENT DOCUMENTS

| | | |
|---|---|---|
| CN | 103136703 A | 6/2013 |
| CN | 103456054 A | 12/2013 |
| JP | 2003288472 A | 10/2003 |
| JP | 2004126791 A | 4/2004 |
| JP | 2005267179 A | 9/2005 |
| JP | 2006202229 A | 8/2006 |
| JP | 2007034752 A | 2/2007 |
| JP | 2010000178 A | 1/2010 |
| JP | 2012244846 A | 12/2012 |
| JP | 2013188019 A | 9/2013 |
| JP | 2016042275 A | 3/2016 |
| JP | 6152919 B1 | 6/2017 |
| RU | 2014154398 A | 7/2016 |
| WO | WO-2017106972 A1 | 6/2017 |
| WO | WO-2019108320 A1 | 6/2019 |

OTHER PUBLICATIONS

JP Office Action for Japanese Application No. 2020-528428 mailed Mar. 23, 2023.
RU 2020120970 Office Action mailed Dec. 2, 2021.
CN Office Action for Chinese Application No. 201880077434.8 mailed Jan. 12, 2024.

* cited by examiner

SYSTEM AND METHOD FOR CROWD MANAGEMENT AND MAINTENANCE OPERATIONS

CROSS-REFERENCE TO RELATED APPLICATION

This application is a continuation of U.S. Non-Provisional patent application Ser. No. 17/219,998, entitled "SYSTEM AND METHOD FOR CROWD MANAGEMENT AND MAINTENANCE OPERATIONS," filed Apr. 1, 2021, which is a continuation of U.S. Non-Provisional patent application Ser. No. 15/826,357, entitled "SYSTEM AND METHOD FOR CROWD MANAGEMENT AND MAINTENANCE OPERATIONS," filed Nov. 29, 2017, which are hereby incorporated by reference in their entireties.

BACKGROUND

The present disclosure relates generally to the field of amusement parks. More specifically, embodiments of the present disclosure relate to methods and equipment utilized to manage crowd control and maintenance of equipment associated with amusement park experiences.

In recent years, theme parks and amusement parks have become more popular and accessible, thereby increasing the average number of patrons that visit the theme parks each day. The expansion of parks with additional and more complex attractions (e.g., rides, restaurants, shops, and shows) generally provides an amusement park with additional capacity to handle a larger number of guests. However, the additional attractions also typically provide potential guests with an incentive to visit the amusement park. Thus, while a particular amusement park may add additional capacity, the additional capacity does not always result in an increased ability for guests to participate in park entertainment (e.g., shopping, viewing shows, riding rides) or reduced wait times for attractions. This is because there is often a corresponding increase in attendance. While guests have desired bigger, better, and more elaborate attractions, they also expect a positive overall experience. Providing a positive overall experience for amusement park guests entails addressing certain issues related to controlling the crowds and wait times associated with certain attractions. Indeed, it is now recognized that park guests can be deterred from returning to a particular amusement park due to negative experiences with large crowds resulting in longer wait times. Accordingly, it is now recognized that it is desirable to improve amusement park crowd control systems and methods. Moreover, the increase in guest traffic can cause equipment associated with the attraction to require service more frequently than usual. As such, it may be beneficial to improve park maintenance systems and methods.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a crowd management system includes at least one local controller associated with an attraction area of an individual attraction within a theme park. The crowd management system includes a transceiver of the at least one local controller, where the transceiver receives guests data via wireless signals from guest-associated devices within a detection range of the at least one local controller. The crowd management system includes a remote central controller in communication with the at least one local controller. The remote central controller receives the guest data from the at least one local controller and determines one or more crowd metrics of the individual attraction based on the received guest data. The remote central controller generates an activity command based on the determined one or more crowd metrics. The remote central controller transmits the activity command to at least one guest-associated device of the guest-associated devices.

In accordance with an embodiment, a crowd management system includes a plurality of local controllers associated with respective attractions within a theme park. The system includes a central controller in communication with the plurality of local controllers, where the central controller receives communications from the plurality of local controllers, where the communications comprise guest population information based on detection of wireless guest devices in proximity of the respective attractions. The central controller determines one or more crowd metrics of the respective attractions based on the determined communications, where the crowd metrics include guest population information based on detection of wireless guest devices in proximity of the respective attractions. The central controller generates an activity command for an individual guest based on the one or more crowd metrics, and transmits the activity command to a device associated with the individual guest.

In accordance with one embodiment, a system includes interactive equipment elements of an individual attraction within a theme park. The interactive equipment elements include one or more sensors and a controller to receive data from the one or more sensors. The data includes information indicative of guest interactions with the interactive equipment elements. The controller determines one or more maintenance-related metrics of the interactive equipment elements based on the received data. The controller generates a maintenance command for the interactive equipment elements based on the one or more maintenance-related metrics and deactivates the interactive equipment elements based on the maintenance command. The controller may activate different interactive equipment elements upon deactivating the interactive equipment elements.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
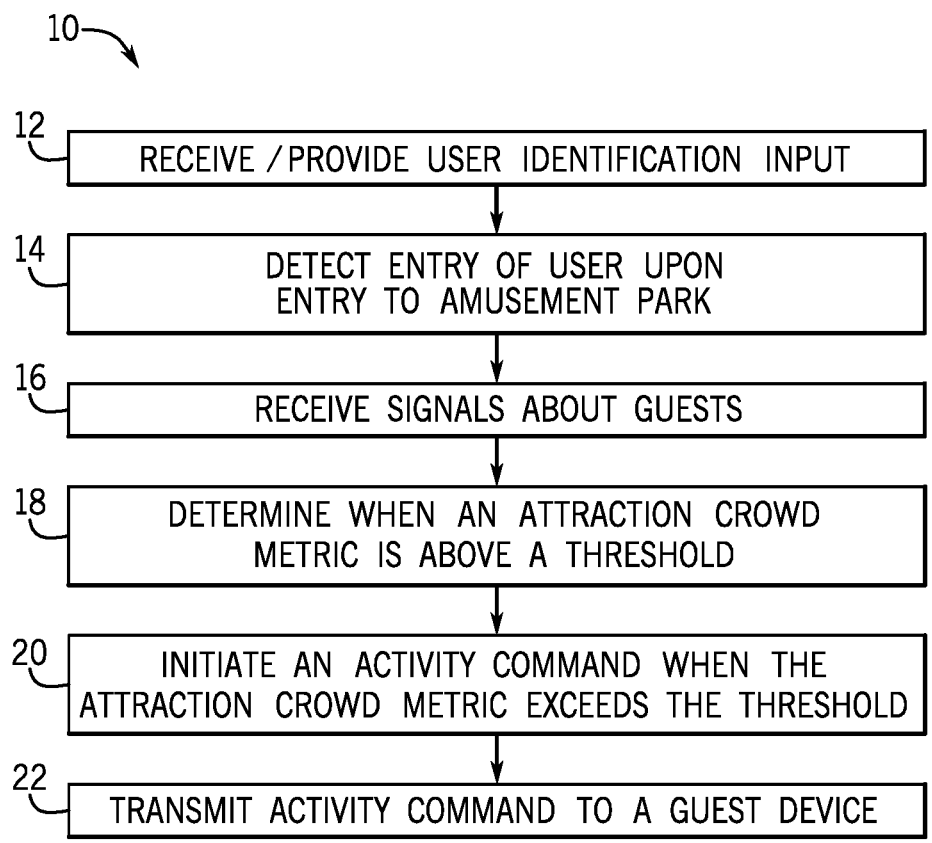
FIG. 1 is a flow diagram of a method using a crowd management system in accordance with present embodiments.

Presently disclosed embodiments facilitate virtual crowd management within a theme park. A virtual crowd management system as provided herein manages guest population between and within various attractions of the theme park to limit or eliminate large crowds waiting in a line or waiting to access features at a given attraction, such as a ride. For example, when a particular ride or region of a park is too crowded, all or some guests in the crowded area may receive notifications that new rewards or features are available in another section of the park. These messages incentivize users to redistribute within the park to decrease the guest population in the crowded area and to provide increased enjoyment. Further, the disclosed techniques may be used to manage interactive equipment elements within the amusement park. In one embodiment, interactive equipment elements may be dynamically activated as an incentive to move guests to new locations within the park and/or within a particular attraction. Further, interactive equipment elements may be controlled to be less active or responsive when in a crowded area. In this manner, guests lose interest in particular interactive equipment elements as the surrounding area becomes more crowded, thus creating a feedback loop to cause a local decrease in crowding around the interactive element.

In certain embodiments, the disclosed techniques include a controller (e.g., remote central controller) that assesses metrics of guest population and distribution (e.g., crowd metrics) and sends messages or other notifications to the guests that incentivize desired guest distribution, e.g., notifications relating to activity sequences to be performed by the guest that incentivize the guest to leave a crowded attraction. The system receives various inputs from local controllers associated with the attraction(s) and/or the guests that are used to dynamically manage the crowds and/or the interactive equipment. In certain embodiments, crowd management is managed in part via guest devices such as active wearables (e.g., bracelets, wearable tags, necklaces or badges) that are carried by or associated with the guests and that interact with various attractions, and which signal the guest to leave the attraction, go to different areas of the attraction, or go to different areas of the park. In other embodiments, the crowd management can be managed via an application on the guests' mobile devices.

The signals may also be used by the controller to gather data about the maintenance of equipment associated with the given attraction and output a maintenance request to a display or operator when the equipment needs servicing. The controller may be configured to communicate with a maintenance controller, or the controller may monitor and control maintenance of the equipment. For example, maintenance of the equipment may be monitored via sensors such as impact sensors, accelerometers, time of operation sensors, piezosensors, optical sensors, or any other suitable sensors to monitor the equipment associated with the attraction, e.g., interactive equipment elements. The sensors may output signals to indicate how long the attraction has been interacted with, how long the attraction has been on or in use, to indicate wear on a portion of the attraction, and so forth. When the remote central controller determines that the equipment has reached a maintenance threshold (e.g., an upper operating limit, been in service too long), the remote central controller may alert an operator or output a message to a display that service or maintenance operations should be performed.

FIG. 1 is a flow diagram of a method using a crowd management system in accordance with present techniques. The method 10 initiates by receiving and/or providing (block 12) user identification information for guests and detecting (block 14) entry of the guest when the guest enters the amusement park. Once in the park, the method 10 includes receiving (block 16) one or more signals about the guests, such as data associated with the guests and collected or provided as part of the credential information. The data may be provided via the local controller and/or the guest's associate device (e.g., active wearable) and may include information such as the guest's position or location. The method 10 may include determining (block 18) a crowd metric of or in an individual attraction, such as when an attraction wait time is above a threshold. The method 10 includes generating (block 20) an activity command based on the one or more crowd metrics. In some embodiments, the activity command may include a message or notification to the individual guest to go to a different attraction of the respective attractions. The method 10 may include transmitting (block 22) the activity command to the guest associated device or an application on the guest's mobile device. Details of the aspects of the method 10 will be discussed in further detail below with respect to related system features.

Figure 2:
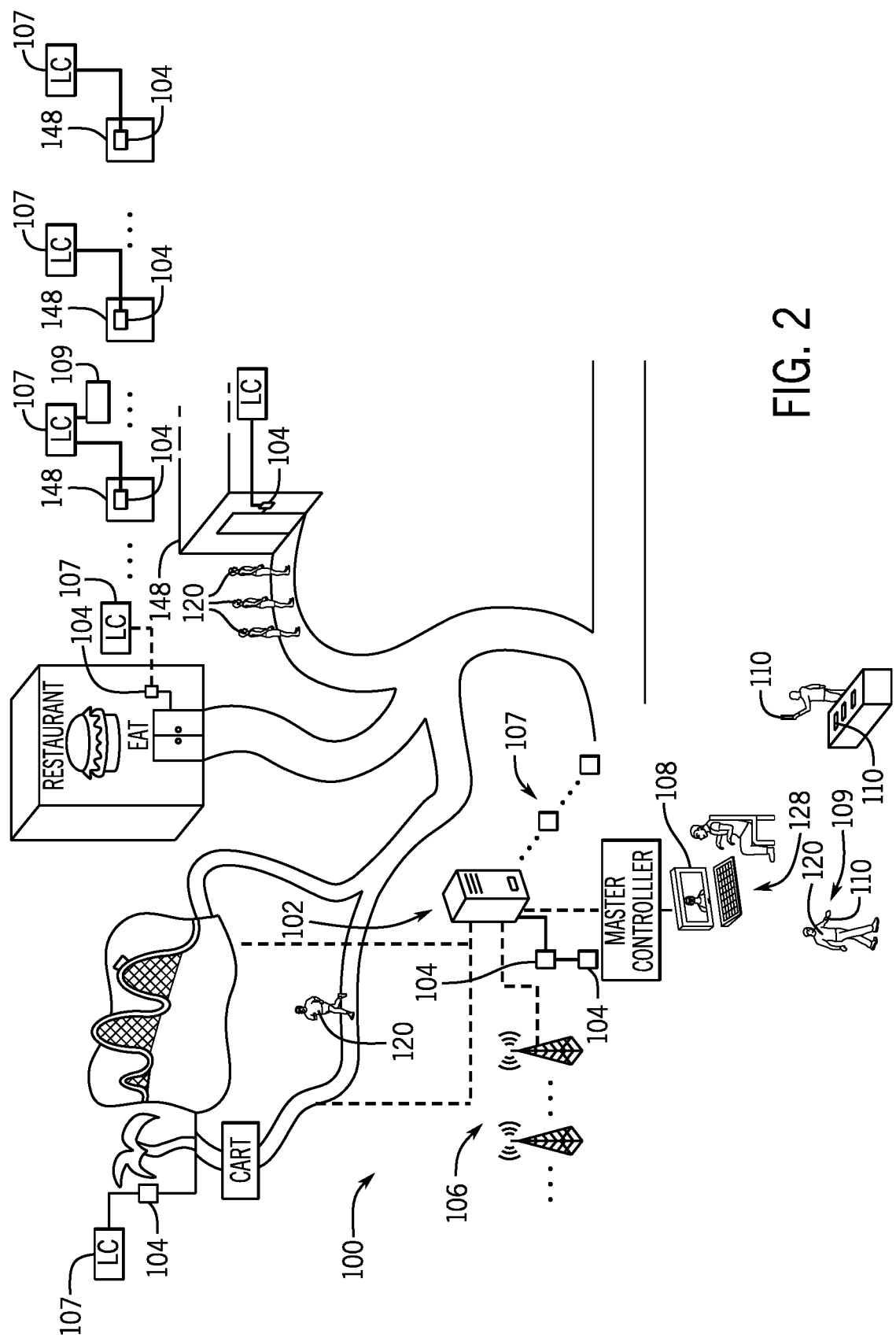
FIG. 2 is a schematic view of a theme park including a crowd management system in accordance with present embodiments.

FIG. 2 is a schematic view of a theme park including a crowd management system in accordance with present techniques. The system 100 includes a remote central control system 102, monitoring sensors 104, a wireless communication system 106, a local control system 107, system displays 108, active wearables 110 (e.g., a bracelet including accessible data and communication features) and other components that coordinate in accordance with present embodiments, as will be described in detail below. Certain aspects of the system 100 will be referenced with respect to the part they play in the method 10 illustrated by FIG. 1. Specifically, it should be noted that present embodiments facilitate crowd management such that amusement park guests 120 can be directed or incentivized to enter a particular region or attraction in the park. Present embodiments may function to encourage participation in other areas of an amusement park, such as dining, shopping, and other entertainment venues (e.g., rides, shows) in other regions of the park.

As generally represented by block 14 of method 10, when guests 120 arrive at a ticketing location (e.g., guest service counter, park gate), the guests 120 may be provided with entry credentials (e.g., tickets or active wearables 110) among other items, such as a park map. Informational media (e.g., audio, video) and instructional signage may be present at all such ticketing locations. While certain disclosed embodiments are discussed in the context of guest-associated devices such as active wearables 110, it should be understood that guest-associated devices may also include guest mobile devices (e.g., smart phones). In some instances, guests 120 may have obtained entry credentials prior to arrival and may skip acquiring such credentials at the ticketing location. The entry credentials may be tied to user identification information provided by each guest (represented by block 12) or a guest profile.

As generally represented by block 16 of method 10, the remote central controller 102 operates to receive signals about the guests 120 from the user's associated device (e.g., the active wearable 110). The signals may include guest identification information and/or information about the location of the guests 120 as determined via signals output from the user's associate device (e.g., the active wearable 110). Other information about the guests 120 may be output from an attraction 148, including the wait time of the guest 120 in an area of the park, the number of times the guest 120 attempted to interact with an attraction, and so forth as determined by the guest's interactions with one or more interactive equipment elements. As a specific example, when the guest 120 has attempted to interact with a particular attraction 148, such as by repeatedly making physical contact with an interactive equipment element of the attraction 148, the active wearable 110 and/or the interactive equipment element may provide signals to a local controller 107 that in turn are passed to the remote central controller 102 to indicate this.

As generally represented by block 18, the method 10 may include determining when the number of guests 120 and/or an anticipated wait time for the attraction 148 is above a threshold. For example, the active wearable 110 may output signals to the remote central controller 102 that indicate that the guest 120 has been waiting in the area of the attraction for more than a threshold amount of time (e.g., over 30 minutes). Wait time may be determined from guest location information and guest identification information as determined via signals from one or more active wearable sensors 109 (e.g., readers, wireless communication beacons) positioned at the attraction and configured to receive identification signals from each active wearable 110 in range. For example, when an active wearable 110 having a particular guest identification number is determined to be in range of a particular active wearable sensor 109, an average wait time may be estimated. In one example, the average wait time may be determined by comparing a previous position of the guest 120 to a new position of the guest 120 to determine how long the guest 120 remained located near the attraction 148.

As generally represented by block 20, the method 10 may include initiating an activity command when the attraction wait times or other crowd management metrics exceed a threshold. As generally represented by block 22, the method 10 may include transmitting the activity command to the guest device (e.g., the active wearable 110). Present embodiments may function to encourage participation of the guests 120 in other areas of the park. For example, the activity command may request that the guest 120 leave from the ride the guest is waiting in line for to go to another area of the park to complete an activity (e.g., ride a different ride). Upon completing the activity command (e.g., one or more tasks), the guest 120 may be rewarded by being offered an enhanced user experience when the guest 120 returns to the ride for which the guest 120 was originally waiting. Once the guest 120 has completed a task associated with the activity command, the guest 120 can mark the task complete on the active wearable 110 by interacting with the display of the active wearable (e.g., marking the task complete). When the guest 120 marks the task complete, the remote central controller 102 receives a signal from the active wearable 110 that the guest 120 has completed the task. As such, the remote central controller 102 is alerted to the possibility that the guest 120 may be ready to return to the original attraction. In some embodiments, the remote central controller 102 may determine that the crowd in the area of the first attraction 148 (i.e., the pond attraction 148) is still too great and the associated wait time is too long. In response, the remote central controller 102 may output another activity command (e.g., another task) to encourage the guest 120 to complete another task. The activity command may be further understood with reference to FIGS. 3-4

Figure 3:
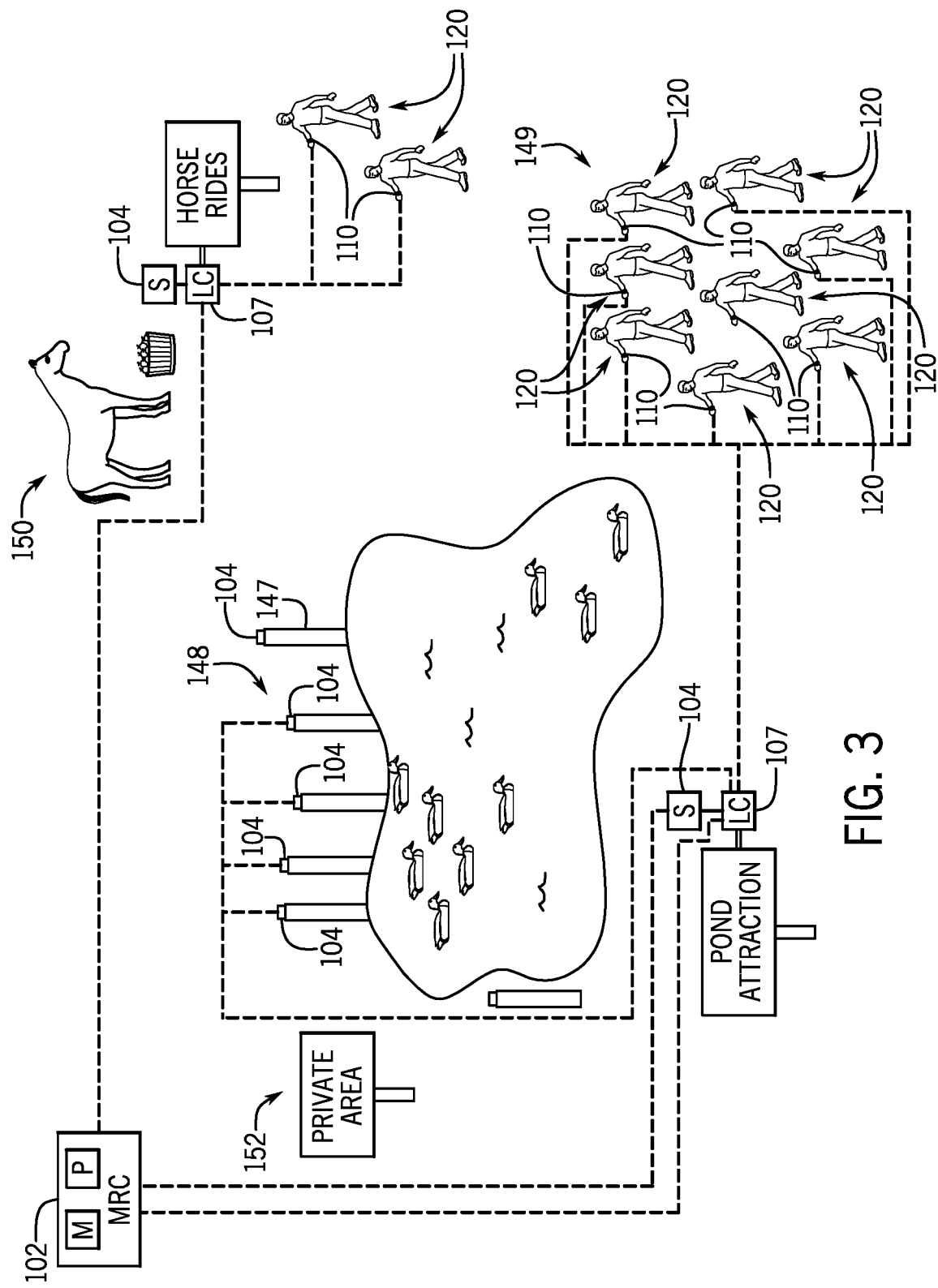
FIG. 3 is a schematic view of a crowded area of the theme park utilizing the crowd management system in accordance with present embodiments.

FIG. 3 is a schematic view of a crowded area of the theme park utilizing the crowd management system 100 in accordance with present techniques. As discussed above, the theme park includes various attractions (e.g., rides). Certain attractions or rides may attract greater interest at a given time. In the illustrated example, the attraction 148 has attracted a large number of guests 120 in an area 149 of the park. The active wearables 110 worn by the guests 120 output respective signals to the remote central controller 102, which assembles information from the signals to indicate the number of guests in the area, the length of the time guests spend in the area, and so forth. Other signals may be received by the remote central controller 102 as well.

For example, the remote central controller 102 may receive signals from the attraction 148 (e.g., sensors 104 associated with the attraction 148). The sensors 104 may include impact sensors, accelerometers, time of operation sensors, piezosensors, optical sensors, cameras, microphones, or any other suitable sensor to monitor the attraction. The sensors 104 may be associated with interactive equipment elements 147 (shown here as duck feed dispensing stations) and may output signals to indicate how long the attraction has been interacted with, how long the attraction has been on or in use, how many actuations each interactive equipment element 147 has experienced to indicate wear on a portion of the attraction, and so forth. When the remote central controller 102 determines that an individual interactive equipment element 147 has reached an upper operating limit, been in service too long, etc., the remote central controller 102 may alert an operator 128 (see FIG. 102) or output a message to the display 108 that service or maintenance operations should be performed. While the depicted interactive equipment element 147 is shown as a duck feed dispenser (e.g., that dispenses a portion of feed upon a guest 120 actuating a button), it should be understood that the interactive equipment element 147 may be configured according to the attraction narrative and may be configured to release an item, provide a special effect, generate a guest reward (e.g., that is in turn associated with a guest profile), etc. Further, the actuation or interaction with the interactive equipment element 147 may be a physical touch, a sensed stylet movement, a sensed audio or visual guest action, etc. In one embodiment, the one or more sensors 104 may include a RFID reader that senses guest proximity to the interactive equipment element 147, whereby the remote central controller 102 and/or the local controller 104 logs proximity as a successful guest interaction. However, to enhance guest immersion and enjoyment, the interactive equipment element 147 may also include mechanical or electronic responses to the successful interaction. In this manner, guests 120 of different physical strength or abilities are nonetheless able to achieve successful interactions with the interactive equipment element 147.

The remote central controller 102 may dynamically adjust configurations for certain attractions that are pushed down to each local controller 107 and active wearable 110. By adjusting the configuration for the attractions, the remote central controller 102 may control the flow of guest traffic to reduce the congestion in the area. Similarly, the remote central controller 102 may control the flow of guest traffic to reduce the number of users that interact with the attraction when the attraction has been interacted with more than is desired. For example, if physical contact has been made with a certain interactive equipment element 147 by a single user for longer than is desired, the remote central controller 102 may initiate a cool-down activity command. The cool-down activity command may be received by the local controller 107 to reduce the output of the affected attraction. In response, the interactive equipment element 147 may stop outputting a response to reduce the interaction with the guest 120. For example, the interactive equipment element 147 may stop lighting up, making noise, giving points, or otherwise generating a reaction in response to the interaction with the guest. In other words, the attraction may reduce the desired response to the guest 120 to encourage the guest 120 to stop interacting with the interactive equipment element 147 of the attraction 148.

In another example, when the remote central controller 102 determines that a crowd metric for a given attraction 148 indicates undesired crowding, the remote central controller 102 may initiate the activity command. The activity command may include requesting that the guest 120 complete an activity, requesting that the guest 120 complete a certain number of tasks from a task list, complete certain tasks in a sequence, and so forth. In the illustrated example, the remote central controller 102 may determine via crowd metrics gathered by the active wearables 110 associated with the guests that the crowd gathered at the attraction 148 (e.g., a pond attraction for feeding ducks) is too large. That is, in one embodiment, a crowd metric is guest density at a particular area 149 or attraction 148, which may be assessed based upon determining a number of detected active wearable signals associated with individual guests 120 generated within the area 149 or at the attraction 148 at a particular time and comparing the number to a threshold. When the estimated number of guests 120 in the area 149 is above the threshold, the crowd metric may be indicative of undesired crowding. In such embodiments, the activity commands may be sent to one or more guest devices (e.g., active wearables 110) determined to be in the crowded area 149 or attraction 148 to encourage the respective guests 120 to leave and go to other areas 149 or attractions 148. Conversely, sparsely populated areas 149 or attractions 148 may trigger activity commands based on crowd metrics indicative of low guest density. Such activity commands may be sent to guests 120 that are not in the sparsely populated areas 149 or attractions 148 but that are located elsewhere in the park. Other crowd metrics may be wait time for an attraction 148, crowd density around a particular interactive equipment element 147, etc. In other words, the remote central controller 102 may generally monitor the attractions 148 with higher crowd densities and the sparsely populated areas 149 at the same time to determine which areas of the theme park the guests 120 may be shifted to.

In order to shift the guests 120 to sparsely populated areas 149, the remote central controller 102 may initiate the activity command based on the crowd metrics to change a game configuration associated with an individual attraction 148, e.g., the pond attraction. The activity command may include transmitting the activity command to the guest-associate devices (e.g., the active wearables 110) to encourage the guests to move to another attraction (e.g., a horse attraction) to control the flow of guest traffic and reduce the pond attraction traffic, as explained further with reference to FIG. 4.

Figure 4:
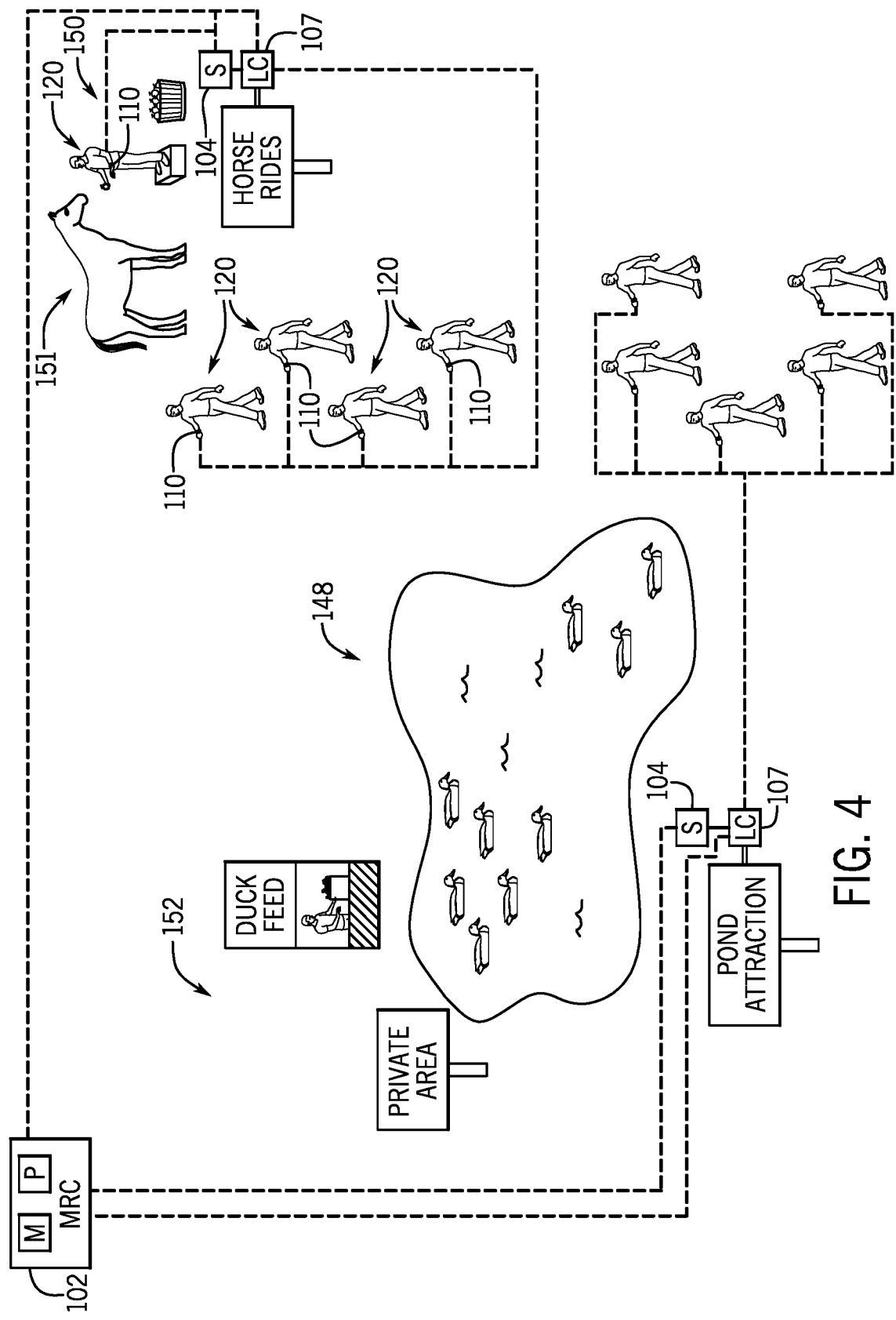
FIG. 4 is a schematic view of a less crowded area of the theme park utilizing the crowd management system in accordance with present embodiments.

FIG. 4 is a schematic view of a less crowded area 151 of the theme park utilizing the crowd management system in accordance with present techniques. In the illustrated example, the activity command has been pushed down from the remote central controller 102 to the local controller 107 and thereby the active wearable 110 associated with the guest 120. As described above, the activity command may include requesting that that the guest 120 complete an activity, requesting that the guest 120 complete a certain number of tasks from a task list, complete certain tasks in a sequence, and so forth. In the illustrated embodiment, the activity command includes requesting that the guest 120 leave the pond attraction (FIG. 3) to visit a horse attraction 150 to alleviate congestion at the pond attraction 148. By following the activity command, the guest 120 may be offered an enhanced user experience when the guest 120 returns to the original attraction (i.e., the pond attraction 148) as explained further below.

Returning to the discussion of the activity command, the guest 120 may be signaled via the activity command output to the active wearable 110 to interact with the horse attraction 150. In the illustrated example, the guest 120 is instructed to complete the task of feeding the horse an apple. Once the guest 120 has completed this task of the activity command, the guest 120 can mark the task complete on the active wearable 110 by interacting with the display of the active wearable (e.g., marking the task complete). When the guest 120 marks the task complete, the remote central controller 102 receives a signal from the active wearable 110 associated with the guest that the guest 120 has completed the task. As such, the remote central controller 102 is alerted to the possibility that the guest 120 may return to the original attraction (i.e., the pond attraction 148). In some embodiments, the remote central controller 102 may determine that the crowd in the area of the first attraction 148 (i.e., the pond attraction 148) is still too great and the associated wait time is too long. In response, the remote central controller 102 may encourage the guest 120 to complete another task. For example, the remote central controller 102 may output another activity command to instruct the guest 120 to complete another task to continue to keep the guest 120 occupied and reduce the congestion in the area of the original attraction (i.e., the pond attraction 148). In some embodiments, the activity command may include only one task for the guest 120 to complete. In other embodiments, the activity sequence may require that the guest 120 complete a certain number of tasks from a task list or complete certain tasks in a sequence. Upon completion of the activity sequence, the guest 120 will be instructed to return to the original attraction (i.e., the pond attraction 148). By completing the activity sequence, the guest 120 may be offered an enhanced user experience (e.g., a unique virtual aspect of the attraction may be enabled). For example, the guest 120 may be offered access to a private area of the pond 152, more food to feed the ducks, and so forth. By completing the activity sequence, the guest 120 will have contributed to a reduction of congestion in the area of the original attraction (i.e., the pond attraction 148).

Figure 5:
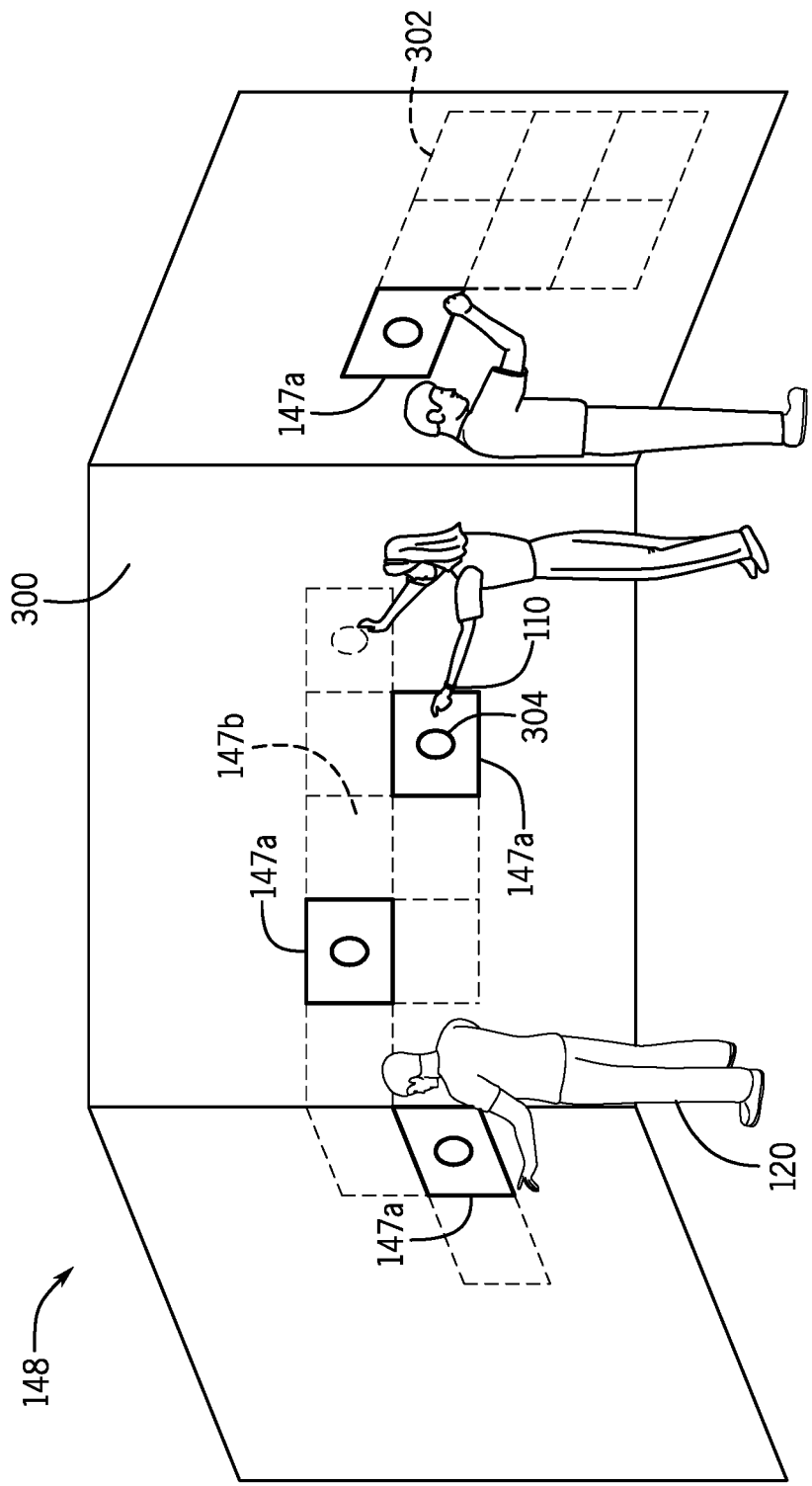
FIG. 5 is a schematic view of an attraction including dynamically activated interactive equipment elements in accordance with present embodiments.

FIG. 5 is a schematic representation of an attraction including an active subset of interactive equipment elements 147a and an inactive subset of interactive equipment elements 147b. In the depicted embodiment, the interactive equipment elements 147 may be generally of the same type, e.g., configured as a wall 300 including interactive panels 302, the interactive panels 302, when active, displaying a chicken egg 304 for an egg collecting feature of the attraction 148. The interactive panels 302 may be configured to be pressed to permit the guest 120 to virtually collect the displayed egg 304. As provided herein, the collection may be logged to or associated with the guest identification of the guest device in proximity to the individual interactive panel 302. For example, the interactive panel 302 may include a RFID reader that reads identification information of the guest device e.g., the active wearable 110. Upon a successful interaction, the active wearable 110 may also light up or otherwise indicate that the interaction is complete to encourage the guest 120 to move on and allow other guests 120 to interact with the wall 300. In one embodiment, the interactive panel 302, once actuated, will go dark or will no longer display the egg 304, indicating that it has been collected. In response, the controller 302 may then provide activation instructions to one of an inactive subset of interactive equipment elements 147b, which may then dynamically become part of the active subset and may start displaying the egg 304. In this manner, the active subset and the inactive subset may change members dynamically and in response to guest actions. Further, the dynamic adjustment may encourage guests to fan out along the wall 300 to reduce crowding, as new eggs 304 may randomly appear at any time. In addition, the dynamic reconfiguration may mask any non-functional or maintenance-queued interactive equipment elements 147 by providing alternate options for the guests 120.

Figure 6:
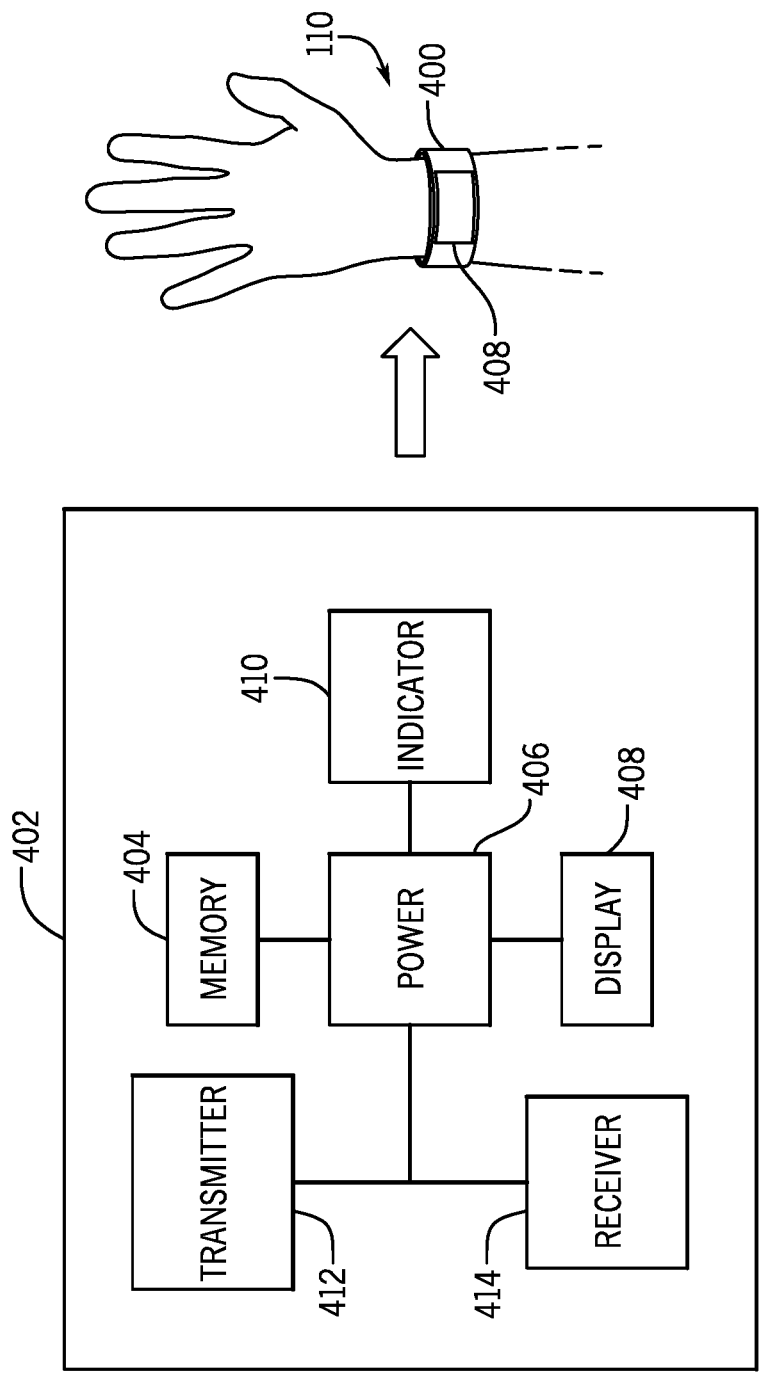
FIG. 6 is a schematic representation of an active wearable in accordance with present embodiments.

FIG. 6 is a schematic representation of a guest device configured as the active wearable 110 in accordance with present embodiments. In the illustrated embodiment, the active wearable 110 includes a housing 400 in the form of a bracelet. However, in other embodiments, it may include a necklace, a headband, a ring, or other conveniently wearable item. A device 402 may be embedded in the housing 400. The device 402 may include several separate or unified components that perform certain functions. In the illustrated embodiment, the device 402 includes a memory/identifier 404, a power module 406, a display 408, an indicator 410, a transmitter 412, and a receiver 414. In some embodiments, the memory/identifier 404 may include a simple identifier (e.g., an RFID tag), which the remote central controller 102 associates with a guest 120. In operation, the device 402 may operate to at least receive information from the remote central controller 102 to provide the guest 120 with information (e.g., the activity command). Specifically, the device 402 may communicate with the remote central controller 102 via the communication system 106. In some embodiments, this may include communication from the device 402 to the remote central controller 102. However, in other embodiments, detecting the device 402 throughout the park area using the monitoring sensors 104 (e.g., proximity sensors) and analyzing such data with the remote central controller 102 may provide information related to the device 402 (e.g., number of users 120 in the vicinity of the attraction, wait times experienced by the user 120 associated with the device 402). The active wearable 110 may include one or more lights or other indicators that may flash or light up in response to successful interactions with interactive equipment elements 147, e.g., in response to wireless signals from the controller 102 indicative of the successful interaction.

Figure 7:
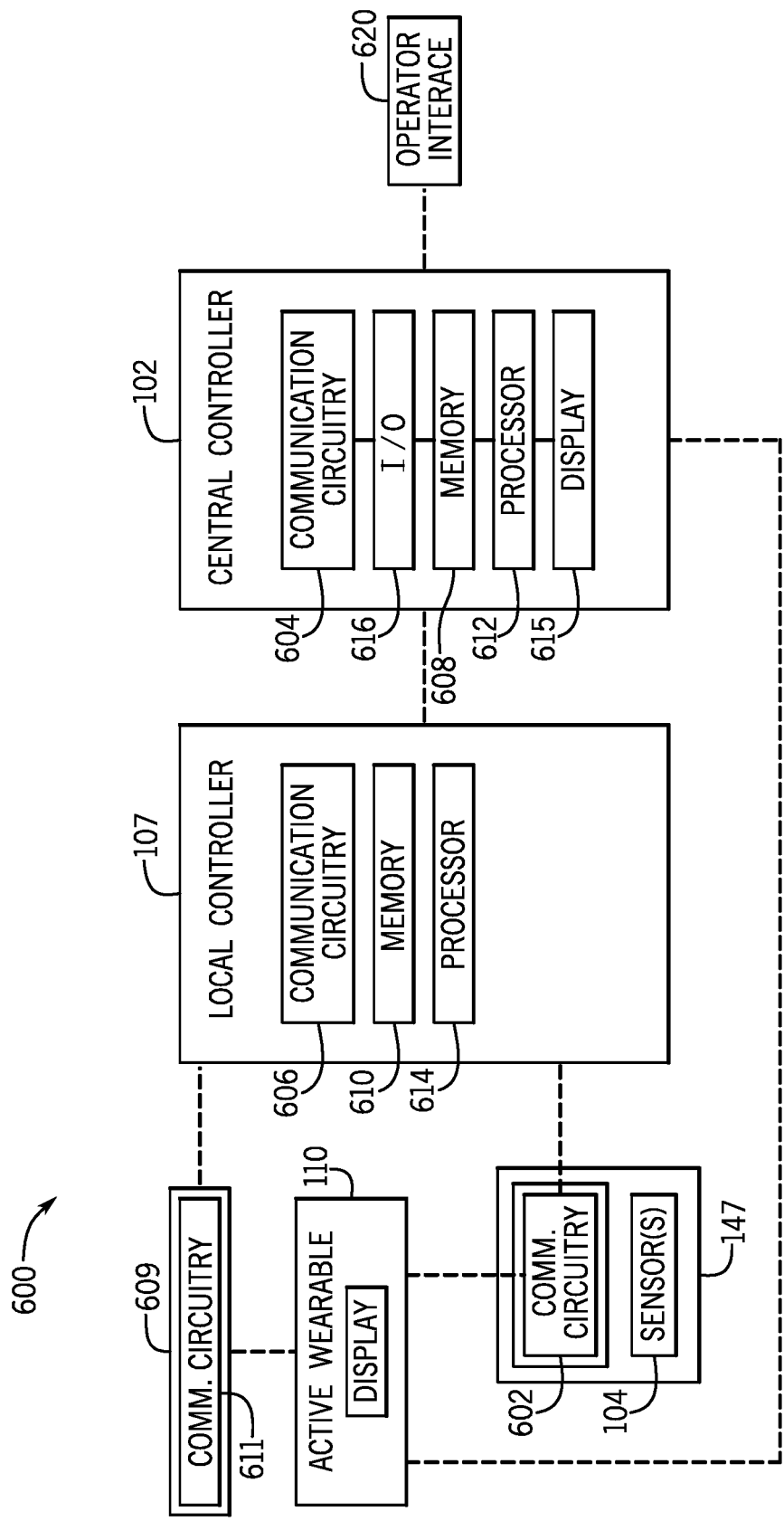
FIG. 7 is a block diagram of a control system that may be implemented to manage crowds in a theme park and/or maintenance of the equipment in the theme park in accordance with present embodiments.

FIG. 7 is a block diagram of a control system 600 that may be implemented to manage crowds in a theme park and/or maintenance of the equipment in the theme park. The system 600 includes the remote central controller 102 in communication with one or more local controllers 107. The local controllers 107 may be co-located with a given attraction or located within a certain radius of the attraction. Each local controller 107 may receive signals from the active wearables 110 associated with respective guests 120. That is, in certain embodiments, each local controller 107 may monitor the number of guests in the vicinity of the attraction. One or both of the remote central controller 102 and the local controllers 107 may include communications circuitry (e.g., communications circuitry 604 or 606), such as antennas, radio transceiver circuits, and signal processing hardware and/or software (e.g., hardware or software filters, A/D converters, multiplexers amplifiers), or a combination thereof, and that may be configured to communicate over wired or wireless communication paths via IR wireless communication, satellite communication, broadcast radio, Microwave radio, Bluetooth, Zigbee, Wifi, UHF, NFC, etc. Such communication may also include intermediate communications devices, such as radio towers. In one embodiment, the communication between the remote central controller 102 and the local controller 107 is wired. The system 600 may also include the interactive equipment element 147, which also may include communications circuitry 602 and one or more sensors 104 as provided herein. The communication between the interactive equipment element 147 and the local controller 107 may be wired or wireless. In addition, the local controller 107 may be in communication with additional readers or other guest device detectors 609 that monitor guest position and identity to determine crowd metrics. Such detectors may include communication circuitry 611 as provided herein.

In addition, one or both of the remote central controller 102 and the local controller 107 may include a display 615, a memory device (e.g., memory device 608 or 610) for storing instructions executable by a processor (e.g., processor 612 or 614) to perform the methods and control actions described herein. For example, the processor 612 may execute instructions for crowd management based on inputs from the local controller 107 as well as data on guest entry into a ride and guest exit from a park. Additional inputs may include a guest location within the park or how long the guest has been in the vicinity of the attraction. For example, an activity command may be generated and output to the user's active wearable based at least in part on the guest's location relative to the attraction, as determined via wireless signal or global positioning system (GPS) information from the guest active wearable. The system 600 may store guest locations during a park visit to create an accessible log of guest locations within the park for use in determining which guests will be incentivized to leave an attraction and later return for an enhanced user experience. If the guest is estimated to be located within a first distance relative to the attraction for a first time, a message with the status of his or her wait time is sent to the active wearable (e.g., "20 MINUTES UNTIL DUCK FEEDING"), which accounts for the user being one of the first guests to arrive at the attraction. If the guest instead arrived later to the attraction when the crowds are larger than an acceptable threshold upper limit, the activity command may be generated (e.g., "FEED THE HORSE AT HORSE RIDE ATTRACTION TO RECEIVE A BETTER DUCK FEEDING EXPERIENCE WHEN YOU RETURN") to account for the crowd in the vicinity and increased wait time for the attraction 148. In this manner, guests that arrived later to the attraction may be incentivized to return to the attraction later when the crowds have dispersed or the crowds have reduced to an acceptable amount.

The processor may include one or more processing devices, and the memory may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the processor or by other processor-based devices (e.g., mobile devices). For example, the remote central controller 102 and the local controller 107 may be accessed by an operator interface 620, e.g., a computer-based workstation or a mobile device, and/or may include an input/output interface 616.

The remote central controller 102 may, in certain embodiments, dynamically present ride options to each guest via the active wearable 110 to encourage the guest 120 to first access historically less-crowded attractions so that the user can have an enhanced experience when he accesses the more-crowded attractions.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The invention claimed is:

1. A system, comprising:
    interactive equipment elements of an individual attraction within a theme park;
    one or more sensors; and
    a controller comprising a memory storing instructions and a processor configured to execute the instructions to:
        receive data from the one or more sensors, wherein the data comprises information indicative of guest interactions with the interactive equipment elements;
        determine, using the processor, one or more maintenance-related metrics of the interactive equipment elements based on the received data;
        generate a maintenance command for the interactive equipment elements based on the one or more maintenance-related metrics;
        transmit a signal using communication circuitry to deactivate the interactive equipment elements based on the maintenance command; and
        transmit a signal using the communication circuitry to activate different interactive equipment elements based on the maintenance command, wherein the interactive equipment elements are spaced apart from the different interactive equipment elements within the individual attraction, and wherein the interactive equipment elements are not the same as the different interactive equipment elements.

2. The system of claim 1, wherein the controller is configured to transmit an activity command related to the different interactive equipment elements to one or more guest devices upon activating the different interactive equipment elements.

3. The system of claim 1, wherein the controller is configured to transmit the maintenance command to a task program to queue maintenance request.

4. The system of claim 1, wherein the maintenance command comprises an order to service or replace the equipment.

5. The system of claim 1, wherein the one or more sensors comprise impact sensors, accelerometers, time of operation sensors, piezosensors, optical sensors, or a combination thereof.

6. The system of claim 1, wherein the maintenance-related metrics comprise a number of guest interactions with the interactive equipment elements.

7. The system of claim 1, wherein the one or more maintenance-related metrics is indicative of wear on a portion of the attraction.

8. The system of claim 1, wherein the one or more maintenance-related metrics is indicative of an upper operating limit of an individual interactive equipment element.

9. The system of claim 1, wherein the one or more maintenance-related metrics is indicative of maintenance for a mechanical or electronic response of an individual interactive equipment element.

10. A method, comprising:
    receiving data from one or more sensors at a controller, wherein the data comprises information indicative of guest interactions with interactive equipment elements of an attraction comprising time of the guest interactions;
    determining, using a processor of the controller, that the interactive equipment elements have reached a maintenance threshold;
    using a processor of the controller to generate a maintenance command for the interactive equipment elements based on one or more maintenance-related metrics;
    using a processor of the controller to deactivate the interactive equipment elements based on the maintenance command; and
    using a processor of the controller to activate different interactive equipment elements based on the maintenance command, wherein the interactive equipment elements are spaced apart from the different interactive equipment elements within the attraction, and wherein the interactive equipment elements are not the same as the different interactive equipment elements.

11. The method of claim 10, comprising transmitting an activity command related to the different interactive equipment elements to one or more guest devices upon activating the different interactive equipment elements.

12. The method of claim 10, comprising transmitting the maintenance command to a task program to queue maintenance request.

13. The method of claim 10, wherein the maintenance command comprises an order to service or replace the equipment.

14. The method of claim 10, wherein the one or more maintenance-related metrics is indicative of wear on a portion of the attraction.

15. The method of claim 10, wherein the one or more maintenance-related metrics is indicative of an upper operating limit of an individual interactive equipment element of the interactive equipment elements.

16. The method of claim 10, comprising displaying an indication of the maintenance command.

17. The method of claim 16, wherein the indication is indicative of a need for servicing at least one of the interactive equipment elements.

18. The method of claim 10, comprising transmitting the maintenance command form a remote central controller.

* * * * *